William D. Fiser
Robert P. Van Roo
James S. Berry Jr.
Milton D. Anderson Jr.
Monte W. Korb
*INVENTORS*

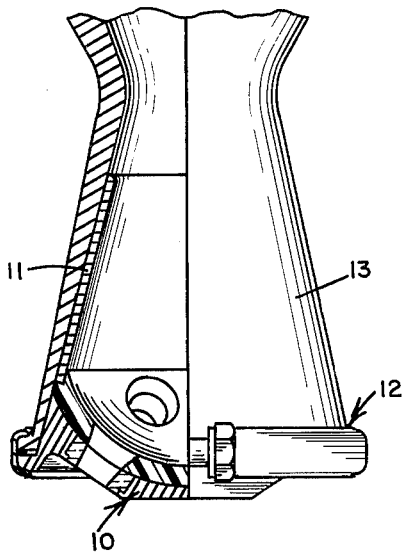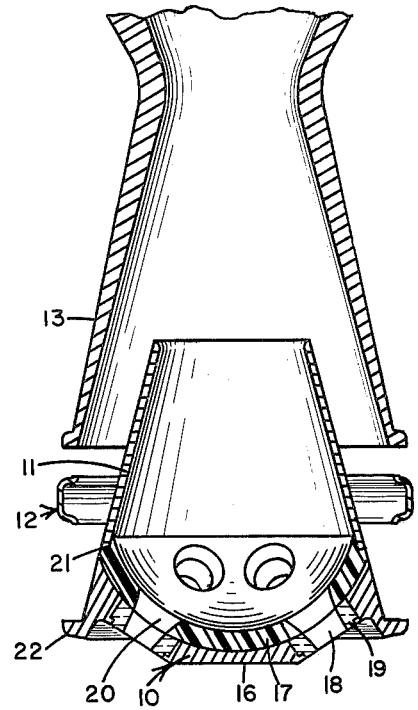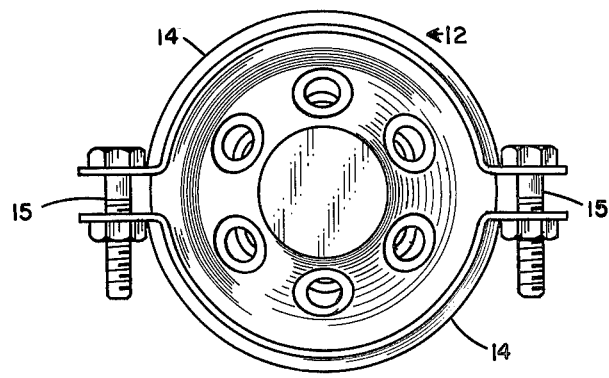

United States Patent Office 3,224,681
Patented Dec. 21, 1965

3,224,681
ALTERABLE THRUST NOZZLE ATTACHMENT
William D. Fiser, Robert P. Van Roo, James S. Berry, Jr., and Milton D. Anderson, Jr., Huntsville, Ala., and Monte W. Korb, San Pedro, Calif., assignors to Thiokol Chemical Corporation, Bristol, Pa., a corporation of Delaware
Filed May 20, 1963, Ser. No. 281,503
8 Claims. (Cl. 239—265.15)

This invention relates to a nozzle attachment for solid propellant rocket motors and, more particularly, to a nozzle attachment for control of the range and thrust of solid propellant rocket motors.

Solid propellant rocket motors, in general, comprise a pressure vessel containing a solid propellant charge. The pressure vessel is provided with a nozzle defining an opening through which the products evolved during combustion of the solid propellant charge escape to produce thrust for propulsion. Solid propellant rocket motors are finding increasing use as propulsion devices for missiles because of their simplicity and instant readiness. Such simplicity, however, is often obtained by a sacrifice of flexibility in comparison with liquid propellant rocket engines. For a missile to be most useful, it should be capable of controlled variation in range. Conventional solid propellant rocket motors do not have the variable thrust or variable burning time capability required for range variation.

It is, accordingly, an object of the present invention to provide a nozzle attachment whereby the range capability of a solid propellant rocket motor may be altered.

It is another object of the present invention to provide a nozzle attachment which may be fitted to an existing solid propellant rocket motor for the purpose of altering its range capability.

It is a further object of the present invention to provide a nozzle attachment whereby the thrust of a solid propellant rocket motor may be altered.

These and other objects and advantages of the present invention will be readily appreciated as the same becomes better understood.

The objects of the present invention are achieved in general by utilizing a detachable exit baffle provided with a plurality of ports that are symmetrically arranged in and canted at an angle to the axis of the baffle. The baffle is adapted to be detachably secured in the exit-cone section of a rocket motor nozzle by any of a number of well-known command-releasable retaining means.

The invention is illustrated by way of example in the accompanying drawings in which:

FIGURE 1 is a view, partly in section, showing the nozzle attachment in place in a nozzle.

FIGURE 2 is an aft elevational view showing the nozzle attachment in place in a nozzle.

FIGURE 3 is a sectional view showing the nozzle attachment being ejected from a nozzle.

Figure 4:
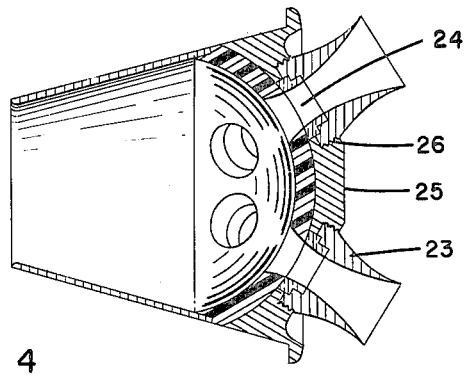
FIGURE 4 is a sectional view of an alternate embodiment of the exit baffle and nozzle protecting sleeve.

Referring to FIGURE 1, there is shown one embodiment of the present invention comprising an insulated exit baffle 10. An insulating nozzle protecting sleeve 11 is bonded to the baffle 10. Retaining means 12 detachably secure the baffle 10 and sleeve 11 within a rocket motor nozzle 13. The baffle 10 and sleeve 11 are more fully shown in FIGURE 3.

In FIGURE 2, in which the assembly of FIGURE 1 is seen from the rear, the retaining means 12 may be seen as a split clamping ring 14 held by a pair of explosive bolts 15. These explosive bolts 15 are detonated by a firing circuit (not shown) upon receipt of a command signal.

In FIGURE 3, the baffle 10 and sleeve 11 are seen being ejected from the nozzle 13 after the retaining means 12 has been released by detonation of the explosive bolts 15. The construction of the exit baffle 10 can be most clearly seen in this figure. The exit baffle comprises a plate 16 having a plate insulating member 17 bonded to it. The plate 16 is generally dome-shaped, and is provided with a plurality of ports 18 symmetrically arranged and canted at an angle to the axis of the baffle 10. Each of the ports 18 is provided with a refractory insert 19. The plate insulating member 17 is provided with a plurality of ports 20 in cooperating alignment with the ports 18 of the plate 16. The generally conical nozzle protecting sleeve 11 is contoured to closely fit within a rocket nozzle and is bonded to a peripheral recess 21 of the plate insulating member 17. In this embodiment, the plate 16 is provided with a peripheral flange 22 for cooperation with a retaining means 12 as shown in FIGURES 1–3.

In FIGURE 4, there is shown an alternate embodiment of the present invention substantially the same as that shown in FIGURES 1–3 except that short divergent sections 23 have been provided for each of the ports 24. In this embodiment, the plate 25 is provided with threaded port openings 26 to receive the divergent sections 23.

Figure 5:
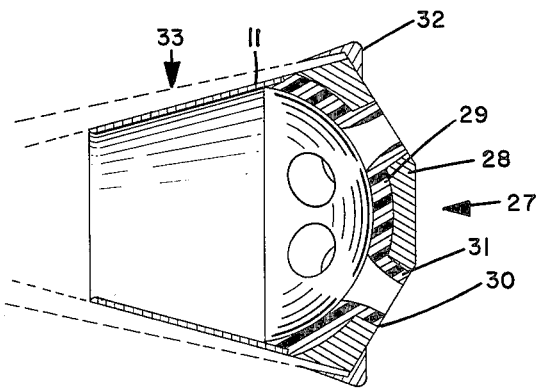
FIGURE 5 is a sectional view of a second alternate embodiment of the exit baffle.

In FIGURE 5, there is shown a second alternate embodiment 27 of the present invention suitable for use with nozzles not provided with a peripheral flange. In addition, in this embodiment, a modified plate 28 and plate insulating member 29 are pressure molded to form a unitary structure. During the molding process, portions of the material forming the plate insulating member 29 are forced through the port openings 30, forming integral port insulating sections 31. The internal port contour may be formed during the molding process, or may be subsequently machined. A nozzle protecting sleeve 11 is bonded to the unitary plate-insulating member, as in the previous embodiments. A split collet-type collar 32 which bears against the exterior of the nozzle 33 and the outer face of the plate 28 may be used as a retaining means in this form of the invention.

When considering the present invention and its operation, the distinction between the various aspects of thrust must be kept in mind. Generated thrust is that thrust obtainable from a rocket motor if all the combustion gases are exhausted axially through a nozzle with a diverging section of optimum expansion ratio. Propelling thrust is that portion of the generated thrust which is useful in propelling the rocket; i.e., that portion of the generated thrust which acts along the flight axis of the rocket. The propelling thrust plus any losses, deliberate or otherwise, is equal to the generated thrust.

Figure 6:
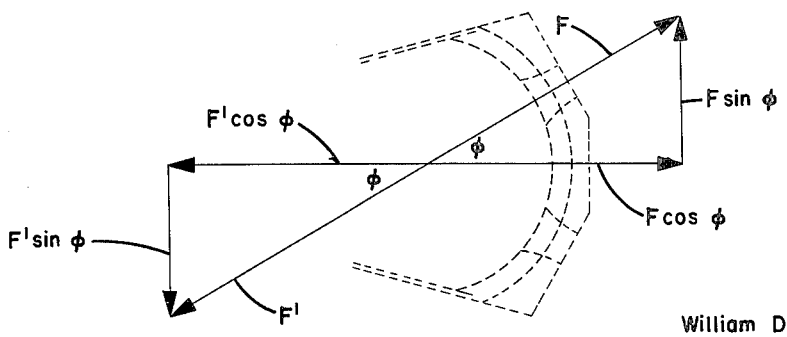
FIGURE 6 is a force diagram illustrating the action of the nozzle attachment.

The basis of operation of the nozzle attachment of the present invention should now be apparent from consideration of the force diagram of FIGURE 6, in which action forces (exhaust) are designated by F and reaction forces (thrust) by F'. The total exhaust gas stream from a rocket motor is split into a plurality of gas streams, each directed at the same radial angle ($\phi$) to the axis of the baffle. The action force F of each of these gas streams is matched by a corresponding reaction force F' of opposite direction.

Both action and reaction forces can be resolved into two vector components, one at right angles to the baffle axis (a sine function) and one parallel to the axis (a cosine function). Only the reaction (thrust) vector components parallel to the baffle axis will be effective in propelling the rocket along this axis. The sum of these vector components will be the propelling thrust and will be equal in magnitude to the product of the generated thrust, the cosine of the angle of cant, and the thrust coefficient (efficiency factor) of the baffle ports.

The several right angle vector components will counterbalance, resulting in zero net side thrust; and the stability of the rocket will thus be unaffected. Since the baffle ports have limited divergent sections, their efficiency will be less than that of equivalent nozzles incorporating optimum expansion divergent sections. For this reason, there will be a certain reduction of trust even if the angle of cant is zero. This reduction of trust will depend upon the thrust coefficient of the baffle ports, but will be of constant magnitude for a particular port configuration regardless of the angle of cant. The total thrust reduction will be equal to the loss of thrust due to the less efficient baffle ports plus the vector loss ($F'$ sin $\phi$) due to diversion of the exhaust gases. Vector losses will increase in magnitude as the angle of cant increases.

When the baffle is ejected from the rocket motor nozzle upon release of the retaining means, the exhaust will no longer be diverted; and the motor will be operating through a more efficient nozzle. All of the generated thrust will then be exerted along the nozzle axis and will be effective in propelling the rocket. The propelling thrust will then be equal in magnitude to the generated thrust.

The pressure at which a rocket motor operates is determined by the smallest total area through which the combustion products must pass. Normally the nozzle throat will be the smallest area, and only the combustion chamber will be at operating pressure. As long as the ratio of the pressure aft of the throat to the pressure forward of the throat (in the chamber) is less than the critical pressure ratio (approximately 0.53) the combustion chamber will be effectively isolated from pressure fluctuations aft of the throat. Any obstruction aft of the throat, such as the baffle of the present invention, which does not cause the critical pressure ratio to be exceeded will, therefore, have no effect upon the chamber pressure.

If the critical pressure ratio is exceeded, pressure disturbances below the nozzle throat will be "reflected" back into the combustion chamber. When the total port area of the baffle of the present invention is less than the throat area, the "reflected" pressure will be higher than that determined by the throat area, and the rocket motor will operate at this higher pressure.

A slight increase in operating pressure will not, normally, adversely affect either the burning time or the structural integrity of the motor. When the structural characteristics of the rocket motor and nozzle and the burning rate characteristics of the propellant permit, it is preferable to operate at slightly increased pressure, since this is a more stable condition for operation when using the nozzle attachment of the present invention. Many rocket motors are designed with a sufficiently large safety factor to permit safe operation at slightly increased pressure. In the event that the safety factor is not large enough to permit such operation, the nozzle attachment will, of course, be operated below the critical pressure limit.

The nozzle attachment of the present invention may be used according to either of two modes of operation. In the first mode, a rocket motor is operated at substantially its original designed chamber pressure and propelling thrust is reduced to a level less than normal by means of the nozzle attachment until such time as the nozzle attachment is released. For operation according to this first mode, the total port area of the nozzle attachment must be approximately 90 percent of the nozzle throat area or larger. When the total port area is between approximately 90 and 100 percent of the throat area, the port area will be the primary pressure regulating factor, since the critical pressure ratio will be exceeded. When the total port area is greater than approximately 110 percent of the throat area, the throat area will be the primary factor. The range between approximately 100 to 110 percent is a transition zone of somewhat unstable operation, in which either or both areas alternately may be the controlling factor. The exact area relationship will obviously be different for different rocket motors and nozzle attachments, for it is the combined effect of a number of motor design factors which will determine the point at which the critical pressure ratio will be exceeded.

The second of the two alternate modes of operation can be employed only with rocket motors specifically designed to permit safe operation at increased pressure. In this mode, the total port area of the nozzle attachment is deliberately made significantly smaller than the nozzle throat area so that the rocket motor will operate at an increased chamber pressure when the nozzle attachment is in place. The operating pressure and, consequently, the propellant burning rate are increased to a level such that the axial thrust component with the nozzle attachment in place has the same magnitude as the axial thrust generated by the motor in normal operation without the nozzle attachment. In normal operation, of course, the motor will be operating at a lower pressure and burning rate—determined by the nozzle throat area. In this mode of operation, propelling thrust will be the same with or without the nozzle attachment in place.

The total burning time (the time for complete combustion of the entire propellant charge) with the nozzle attachment in place will, however, be significantly shorter than the normal burning time of the rocket motor. With the same thrust being applied for a shorter time, the maximum range of the rocket can thus be reduced without affecting the time to any target point within normal range. Operation according to this mode is particularly advantageous when a rocket must reach a target in as short a time as possible, but must not "overshoot" or exceed a specified range less than its normal maximum range.

While the present invention has been described by means of specific examples and in specific embodiments, it should not be limited thereto, for obvious modifications will occur to those skilled in the art without departing from the spirit of the invention and the scope of the subjoined claims.

Having thus described the invention, what is claimed as new and desired to be secured by Letters Patent is:

1. A nozzle attachment for a solid propellant rocket motor having a reaction motor nozzle at the aft end thereof comprising a baffle detachably secured within said reaction motor nozzle, an insulating member bonded to the inner surface of said baffle, said baffle and said insulating member having therethrough a plurality of symmetrically arranged ports canted at an angle to the axis of said baffle and an insulating nozzle protecting sleeve bonded to the peripheral edge of said baffle in contactual relation with at least a portion of the interior surface of said nozzle.

2. A nozzle attachment, as in claim 1, wherein said ports have the form of at least partially expanding nozzles of the DeLaval type.

3. A nozzle attachment assembly comprising a nozzle attachment, as in claim 1, and retaining means for detachably securing said nozzle attachment with said reaction motor nozzle.

4. A nozzle atttachment for a solid propellant rocket motor having a nozzle extending from the aft end thereof and provided with an annular flange on the aft peripheral edge thereof, comprising a baffle having an insulating member bonded to the inner surface thereof and an annular flange on the peripheral edge thereof, said baffle being detachably inserted into said nozzle so that said flanges are in spaced relation to each other, said baffle and said insulating member each having a plurality of mutually aligned, annularly-arranged ports therein that are canted to an angle to the longitudinal axis of said nozzle, an insulating sleeve positioned within and in contact with the inner surface of said nozzle and the peripheral edge of said insulating member, separable clamping means positioned in encompassing relation to said flanges and means operatively associated with said clamping means whereby said clamping means may be removed from engagement with said flanges to permit the disengagement of said baffle and said insulating member from said nozzle.

5. A nozzle attachment, as in claim 4, wherein a short divergent section is detachably connected to each of the ports in said baffle.

6. A nozzle attachment for a solid propellant rocket motor having a nozzle positioned immediately posterior to the burning chamber thereof, comprising a baffle detachably affixed to the aft peripheral edge of said nozzle, an insulating member bonded to the inner surface of said baffle, said baffle and said insulating member having a plurality of mutually aligned, annularly-arranged ports therein that are canted at an angle to the longitudinal axis of said nozzle, a plurality of short divergent sections detachably connected to each of the ports in said baffle and an insulating sleeve positioned within and in contact with the inner surface of said nozzle and the peripheral edge of said insulating member.

7. A nozzle attachment, as in claim 4, wherein said ports have the form of at least partially expanding nozzles of the DeLaval type.

8. A nozzle attachment assembly comprising a nozzle attachment, as in claim 6, and retaining means for detachably securing said nozzle attachment within the nozzle of a rocket motor.

References Cited by the Examiner

UNITED STATES PATENTS

| 2,412,173 | 12/1946 | Pope | 60—35.6 |
| 2,661,692 | 12/1953 | Vegren | 60—35.6 |
| 2,828,604 | 4/1958 | Hirsch et al. | 60—35.6 |
| 2,862,447 | 12/1958 | Lyon | 102—49 |
| 2,924,174 | 2/1960 | McLean | 60—35.6 |
| 2,987,880 | 6/1961 | Kimmel | 60—35.6 |
| 3,001,498 | 9/1961 | Karp | 60—35.6 |
| 3,122,098 | 2/1964 | Glennan | 60—35.6 |

MARK NEWMAN, *Primary Examiner.*

SAMUEL LEVINE, *Examiner.*

C. R. CROYLE, *Assistant Examiner.*